US007210625B2

(12) United States Patent
McNutt et al.

(10) Patent No.: US 7,210,625 B2
(45) Date of Patent: May 1, 2007

(54) SYSTEM AND METHOD FOR MANAGING ASSET INFORMATION

(75) Inventors: Leon J. McNutt, Houston, MN (US); Thomas E. Nastek, Winona, MN (US)

(73) Assignee: Watlow Electric Manufacturing Company, St. Louis, MO (US)

(*) Notice: Subject to any disclaimer, the term of this patent is extended or adjusted under 35 U.S.C. 154(b) by 353 days.

(21) Appl. No.: 10/850,143

(22) Filed: May 20, 2004

(65) Prior Publication Data

US 2005/0258241 A1 Nov. 24, 2005

(51) Int. Cl.
*G06K 19/06* (2006.01)
*G06F 19/00* (2006.01)

(52) U.S. Cl. ...................................... 235/385; 235/492

(58) Field of Classification Search ................ 235/383, 235/381, 382, 382.5, 375, 492, 385; 705/38, 705/7, 35; 709/224, 230, 217, 223
See application file for complete search history.

(56) References Cited

U.S. PATENT DOCUMENTS

| | | | | |
|---|---|---|---|---|
| 4,818,998 | A | 4/1989 | Apsell et al. | |
| 5,043,860 | A | 8/1991 | Koether et al. | 364/138 |
| 5,521,815 | A | 5/1996 | Rose, Jr. | |
| 5,679,944 | A | 10/1997 | Cusey et al. | 235/492 |
| 5,757,021 | A | 5/1998 | Dewaele | 250/581 |
| 5,774,876 | A | 6/1998 | Woolley et al. | |
| 5,841,116 | A | 11/1998 | Lewis | |
| 5,875,430 | A | 2/1999 | Koether | 705/1 |
| 5,936,527 | A | 8/1999 | Isaacman et al. | |
| 6,018,719 | A | 1/2000 | Rogers et al. | |
| 6,081,827 | A | 6/2000 | Reber et al. | |
| 6,144,301 | A | 11/2000 | Frieden | 340/572.8 |
| 6,163,693 | A | 12/2000 | Rydbeck | |
| 6,167,378 | A | 12/2000 | Webber, Jr. | |
| 6,170,748 | B1 | 1/2001 | Hash et al. | |
| 6,177,860 | B1 | 1/2001 | Cromer et al. | |
| 6,181,699 | B1 | 1/2001 | Crinion et al. | |
| 6,182,053 | B1 | 1/2001 | Rauber et al. | |
| 6,208,853 | B1 | 3/2001 | LoVasco et al. | |
| 6,259,367 | B1 | 7/2001 | Klein | |
| 6,374,079 | B1 | 4/2002 | Hsu | 455/11.1 |

(Continued)

OTHER PUBLICATIONS

*What is the NAFEM Data Protocol?*, NAFEM: NAFEM Data Protocol Standard, *date unknown*, See http://nafem.org/resources/DataProtocol/index.cfm?print=yes.

(Continued)

*Primary Examiner*—Thien Minh Le
(74) *Attorney, Agent, or Firm*—Harness, Dickey & Pierce P.L.C.

(57) ABSTRACT

An asset management system and method including an asset and a data tag attached to the asset. The data tag includes a data tag memory and a data tag communication interface. The system also includes asset information stored in the data tag memory, wherein the asset information including a characteristic of the asset. Also an asset management method for managing information related to assets. The method includes initializing a data tag with asset information and includes transmitting asset information to the data tag and storing the asset information in a memory of the data tag. The asset information includes service contact information The method also includes retrieving asset information from a data tag.

45 Claims, 7 Drawing Sheets

U.S. PATENT DOCUMENTS

| | | | | |
|---|---|---|---|---|
| 6,389,542 | B1* | 5/2002 | Flyntz | 726/17 |
| 6,642,843 | B2 | 11/2003 | Satoh | 304/509 |
| 6,651,063 | B1 | 11/2003 | Vorobiev | |
| 6,675,591 | B2 | 1/2004 | Singh et al. | 62/129 |
| 6,757,663 | B1 | 6/2004 | Rogers et al. | |
| 6,792,465 | B1 | 9/2004 | Welsh | |
| 6,901,304 | B2 | 5/2005 | Swan et al. | |
| 6,965,866 | B2 | 11/2005 | Klein | |
| 2002/0111819 | A1* | 8/2002 | Li et al. | 705/1 |
| 2004/0158850 | A1* | 8/2004 | Karaoguz et al. | 725/6 |
| 2004/0177032 | A1* | 9/2004 | Bradley et al. | 705/38 |
| 2004/0255021 | A1* | 12/2004 | Motoyama et al. | 709/224 |
| 2004/0255023 | A1* | 12/2004 | Motoyama et al. | 709/224 |
| 2005/0008348 | A1* | 1/2005 | Collar et al. | 386/125 |
| 2006/0010019 | A1* | 1/2006 | Phillips et al. | 705/7 |
| 2006/0031449 | A1* | 2/2006 | Hallamaa et al. | 709/223 |

OTHER PUBLICATIONS

*Background*, NAFEM: NAFEM Data Protocol Standard, *date unknown*, See http://www.nafem.org/resources/DataProtocol/History/index.cfm?pring=yes.

*For Engineers and Developers: How to use the NAFEM Data Protocol*, NAFEM: NAFEM Data Protocol Standard, *date unknown*, See http://www.nafem.org/resources/DataProtocol/EngDev/index.cfm?print=yes.

*For Engineers and Developers: Protocol Stack Versions*, NAFEM: NAFEM Data Protocol Standard, *date unknown*, See http://www.nafem.org/resources/DataProtocol/EngDev/versions.cfm?print=yes.

*For Engineers and Developers: Management Information Bases*: NAFEM: NAFEM Data Protocol Standard, *date unknown*, See: http://www.nafem/org/resources/DataProtocol/EngDev/mibs.cfm?print=yes.

*NAFEM-Inventory-Management-MIB-Definitions*, Nafem-Inventory-Management-MIB-v2.00.MIB, *date unknown*, See: http://www.nafem.org/resources/tech/MIBs/V2.0/NAFEM-INVENTORY-MANAGEMENT-MIB-DEFINITIONS.CFM.

*NAFEM-Asset-Management-MIB-Definitions*, NAFEM-Asset-Management-MIB-v2.00.MIB, *date unknown*, See: http://www.nafem.org/resources/tech/MIBs/v2.0/NAFEM-ASSET-MANAGEMENT-MIB-DEFINITIONS.CFM.

*NAFEM-Asset-Management-MIB-Definitions*, Asset-management.mib, *date unknown*, See: http://www.nafem.org/resources/tech/MIBs/v2.0/NAFEM-ASSET-MANAGEMENT-MIB.CFM.

*Interface Is Simple and Low Cost*, *date unknown*, See: http://www.towertech.it/products/hardware/ireader-m10x.

*Dolphin iButton Terminal & iButton Reader/Writer*, BarcodeDiscounters.com, *date unknown*, See: http://www.barcodediscounters.com/han-dolphin-ibutton.html.

*Cricket Data Collection Device at TEK Industries: Auto Identification, date unknown*, See: http://www.tekind.com/touchpens/cricket.htm.

*iButton Solutions Partners Database—Digital Data Technician, date unknown*, See: http://db.maxim-ic.com/ibutton/solutions/product.cfm?ID=273.

*CS2 Inc. Digital Data Technician Software, date unknown*, See: http://www.assetdatacollection.com/software.htm.

*Wireless Business & Technology: Wireless data collections: Palm handhelds and tiny iButtons make the process effortless—Wireless in Action, date unknown*, See: http://articles.findarticles.com/p/articles/mi_m0MLY/is_1_3/ai_96531630.

*Asset/Data Management Tags Deliver Information Wherever It is Needed: Computer Chip-Based Electronic Tags Attach Easily and Are Extremely Durable, date unknown*, See: http://www.ibutton.com/news/images/asset.pdf.

Iodesco Oy Secure Identification, "Asset Marking", ©2003, http://web.archive.org/web/20030707014117/www.idesco.fi/apps/asset/asset.htm.

* cited by examiner

SYSTEM AND METHOD FOR MANAGING ASSET INFORMATION

FIELD OF THE INVENTION

The present invention relates to management of asset information and more specifically, to a system and method of tagging an asset with stored asset information and retrieving the stored asset information from the data tag.

BACKGROUND OF THE INVENTION

Appliances and equipment used in a home or business such as cooking stoves, hot water heaters, heating ventilation/air conditioning (HV/AC) units, and refrigerators are assets for which information is required for repair and maintenance as well as for warranty coverage. Serial number, model number, manufactured date, and installed date are often difficult to accurately obtain years after the equipment was manufactured and installed.

Identification tags have been employed to assist in the identification and tracking of physical assets, and to facilitate timely repair and appropriate warranty coverage. Commonly, asset identification tags utilize printed matter for visually providing relevant information about the tagged asset. Typical information includes the type of equipment tagged, the equipment manufacturer and model number, and the date of manufacture.

In other cases, service or installation personnel create paper records at the time of installation. While systems utilizing paper records or printed matter tags are relatively inexpensive, they suffer from problems associated with the loss of the paper work, separation of the asset tag from the asset, failure to adequately file the paper documents, and misreading or incorrect entry of the asset information from the paper record or tag. For paper records, there is physical correlation between the paper records or copies and the asset or physical equipment. Tagged equipment is often placed in a harsh environment such as a commercial or industrial kitchen, and printed information on tags frequently is covered with dirt or grease, so that the printed tag cannot be read. In other environments, the tag material or the print on the tag is damaged or quickly aged by chemical exposure or weather conditions, so that the tag cannot be read. Moreover, considerable time and expense are required to obtain access to the tag, read and record the information, and input the information into a data recordation system.

The lack of pertinent, complete, and accurate asset information and data results in delays in servicing of equipment and identification of required repair parts, and inaccuracies in the appropriate warranty coverage. Inaccurate warranty information provides for increased costs to manufactures as manufacturers often calculate warranty dates on estimates. This inaccuracy also provides for increased customer dissatisfaction when a warranty date for coverage of the repair costs is at issue.

In recent years, electronic technologies have been applied in some cases to replace printed records or printed asset tags. These have included tags with an electronic memory or transponder to store relevant asset information. One solution has been a radio frequency identification (RFID) transponder. Such RFID tags are commercially available for providing either a "read only" output, or a "write and read" output. An identification tag with an RFID transponder is read by a radio frequency reader device, which may electronically record and process the data for inventory, tracking, and warranty purposes. The RFID transponder is placed at a position where the information in the transponder may be read by a remote reader. The cost of reading the identifying information is reduced as the line of sight between the transponder and the reader is often not required. In such systems, the stored information is recorded electronically in a format that does not require the subsequent manual entry of data into a computer.

However, problems associated with electronic or "smart" identification tagging systems such as the RFID tags have limited their use and effectiveness. This includes the high cost of manufacturing the tag, the limited techniques for attaching the tag to the physical asset, and the high cost of initially tagging and retagging the asset. Significant costs are generally associated with initially tagging and subsequently re-tagging the physical asset. RFID tagging systems have significant inventory costs since the entire cost of the tag including the RFID transponder is incurred when the tag is manufactured. When the desired "read only" information in the transponder changes, the manufacturing and inventory cost of the entire tag is effectively lost.

SUMMARY OF THE INVENTION

These limitations and other disadvantages are overcome by the various embodiments of the invention which provides for improved asset data information management and asset information retrieval.

One aspect of the invention is an asset management system for managing asset information. The system includes a data tag for storing asset information. The data tag includes a data tag memory for storing information related to an asset and a data tag communication interface for receiving and transmitting the asset information. Also included is an access device for communicating with the data tag communication interface. The access device includes an access device communication interface and an access device memory. The access device retrieves asset information stored in the data tag memory over the access device communication interface. The system further includes an asset data display for displaying the asset information retrieved from the access tag by the access device.

Another aspect of the present invention is an asset management method for managing information related to assets. The method includes initializing a data tag with asset information and includes transmitting asset information to the data tag and storing the asset information in a memory of the data tag. The asset information includes service contact information. The method also includes retrieving asset information from a data tag.

In another aspect, the invention is an asset management system that includes means for storing asset information in a data tag wherein the asset information includes a characteristic of an asset and contact information for two or more service providers. The system also includes means for attaching the data tag to the asset. The system further includes means for retrieving the stored asset information from the data tag and means for displaying the retrieved asset information. The system includes means for generating a communication as a function of the retrieved asset information.

In yet another aspect, the invention is an asset management method that includes attaching a data tag with a memory to an asset. The method also includes initializing the data tag with asset information including transmitting asset information to the data tag wherein the transmitted asset information is stored in the data tag memory.

In still yet another aspect, the invention is an asset management system including an asset and a data tag attached to the asset. The data tag includes a data tag memory and a data tag communication interface. The system also includes asset information stored in the data tag memory, wherein the asset information includes a characteristic of the asset and service contact information for two or more service providers.

Further aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION

The following description is merely exemplary in nature and is in no way intended to limit the invention, its application, or uses.

Figure 1:
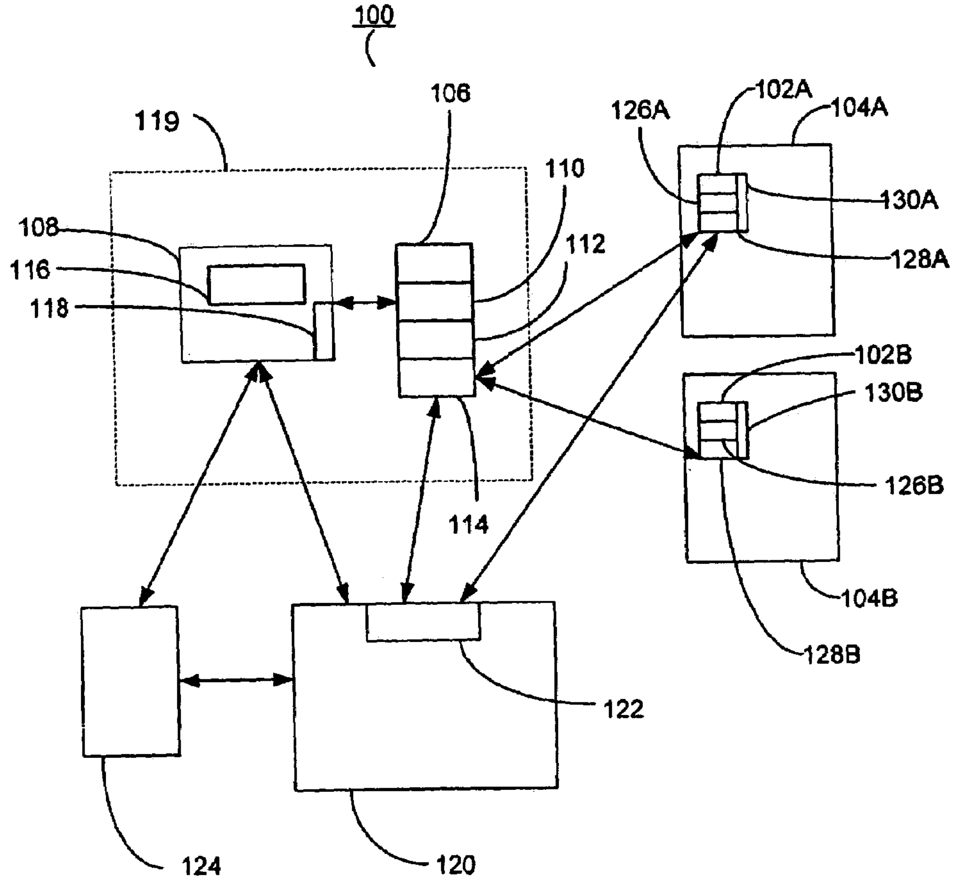
FIG. 1 is a system diagram for an asset management system according to one embodiment of the invention.

In FIG. 1, an asset management system 100 according to one embodiment of the invention includes a data tag 102 (illustrated in two instances as 102A and 102B), an access device 106, and an asset data display 108.

Data tag 102 is associated with a physical asset 104 where each data tag 102A and B is associated with two assets 104A and 104B, respectively. Data tag 102 may be configured for mounting to asset 104 by any type of mounting arrangement or mounting system 130. Various mounting or attachment systems 130A and 103B may include gluing, clipping, magnetic attachment, screwing, bolting, engaging, other attachment methods and systems.

Data tag 102 may also be dimensioned for attachment to one or more assets. Asset 104 may be any type of equipment, apparatus, system or article. For instance, asset 104 may be a commercial appliance, a household appliance, a kitchen appliance, a HV/AC unit, a hot water heater, an audio unit, and a video unit. In one embodiment, asset 104 may be equipment in a restaurant or commercial kitchen such as a griddle, a fryer, a refrigerator, an oven, a blast chiller, a cooking unit, and a refrigeration unit.

Data tag 102 includes a data tag memory 126 for storing information related to asset 104 with which data tag 102 is associated or attached. Data tag memory 126 may be a non-volatile memory or may be a volatile memory. Data tag 102 may also include a local energy source (not shown) in some embodiments. However, in a preferred embodiment, data tag memory 126 is non-volatile memory not requiring a local energy source to store asset information permanently or over an extended period of time.

Asset information stored in data tag memory 126 may include a name of the manufacturer, an equipment classification, a model number, a serial number, a date of manufacture, a date of installation, a software version identification for the asset data software, an asset protocol version, one or more service contacts or service providers, a term of warranty, a length of a warranty, a warranty termination date, data related to a service action, service information, an asset owner name, and an asset location. In the case of a service action, this may include the identification of one or more operating actions or events that may prompt the user to initiate a service call. For example, this may include a recycling of a system or process, a failure, an outage, and a local light or other visual, audible or other indicator.

In one preferred embodiment, data tag memory 126 is configured to receive, store, and transmit asset information compliant with asset management data format defined by the North American Association of Food Equipment Manufactures (NAFEM). Such a preferred embodiment may be used when asset 104 is a commercial or industrial kitchen component or appliance.

Additionally, in some embodiments, data tag 102 may include a unique asset data tag identification that may be stored in data tag memory 126 or may be stored in a hardware or a firmware. A unique asset tag identification may be a number such that a particular data tag 102 may be uniquely and separately identified from any other data tag 102.

Additionally, data tag 102 includes a data tag communication interface 128. Data tag communication interface 128 provides for the receiving and transmission of asset information to and from data tag 102. Data tag communication interface 128 may be any type of communication interface providing a communication of data to and from data tag 102. These may include a touch communication interface, a wireless communication interface, an optical interface, a wired communication interface, and a satellite communication interface.

Access device 106 is configured for communicating with data tag communication interface 128. Access device 106 includes an access device communication interface 114 and an access device memory 110. Access device 106 may also include a data entry 112 for receiving asset information from an external source. Access data entry 112 may be one or more data entry methods or systems including a touch screen display, a keyboard, a mouse, a pointing device, a button, a soft key, or a remote or secondary computer system.

Access device 106 retrieves asset information stored in data tag memory 126 from the data tag communication interface 128 via access device communication interface 114. Additionally, access device 106 may communicate asset information to the data tag 102. In such a case, data tag 102 stores the asset information received from access device 106 in data tag memory 126.

Access device communication interface 112 may also be configured to communicate with asset data display 108 and/or an asset data information system 120.

In one embodiment, access device communication interface 114 communicates with data tag 102 over a communication network, medium, or facility as indicated by one or more of the arrows in FIG. 1. This communication may be via any type of communication medium including a wired telecommunications network such as a public switched telephone network (PSTN), a wireless communications network, a packet data network, an internet, a private data network such as a local area network (LAN), a private voice network, a paging network, a satellite network, and a CATV network.

Access device 106 may be any type of access device configured to perform the functions as described herein. Access device 106 may also include other components such as a display and a processor. Access device 106 may be comprised of a pocket personal computer, a personal data assistant (PDA), custom tag reader, a mobile phone, and a personal computer. A custom tag reader may be a known or specially produced access device 106 designed to communicate asset information with the data tag communication interface 128. For example, when the data tag communication interface 128 is a touch sensitive data tag, access device 106 may be a PDA or a customer tag reader configured with a touch sensitive access wand or interface for electronically transferring the asset information from data tag 102.

Asset data display 108 may be any type of display configured for displaying the asset information retrieved from access tag 102. Asset data display 108 may include a data display communication interface 118 for communicating with access device 106 and for receiving the asset information stored in access device memory 110. Asset data display 108 may include an asset data display memory (not shown) for storing the received asset information.

In operation, access device 106 retrieves and stores a plurality of asset information from a plurality of data tags 102 related with one or more assets 104 at a particular location or locations. Access device 106 stores the retrieved asset information and transmits the asset information to asset data display 108 or asset information system 120. Asset data display 108 stores the received asset information and displays the stored asset information upon request or demand from a user of asset data display 108 or asset information system 120. In another embodiment, asset data display 108 may be associated with a telecommunication device 124 which may be a telephone, DSL modem, cable modem, or other telecommunication device configured for communication to one or more asset information systems 120.

Asset data display 108 and access device 106 may communicate the retrieved asset information to asset data information system 120. Asset data information system 120 may have an information system communication interface 122 for communicating asset information with one or more asset tags 102, with one or more access devices 106, and/or one or more asset data displays 108 as illustrated in FIG. 1.

In one preferred embodiment, data tag 102, access device 106, asset data display 108 and/or asset information system 120 are configured for communicating and storing asset information compliant with an asset management data format defined by the American Association of Food Equipment Manufacturers (NAFEM).

While asset data display 108 and access device 106 are disclosed and illustrated as separate devices in FIG. 1, in one embodiment the two units may be configured as a single combined unit 119.

Figure 2:
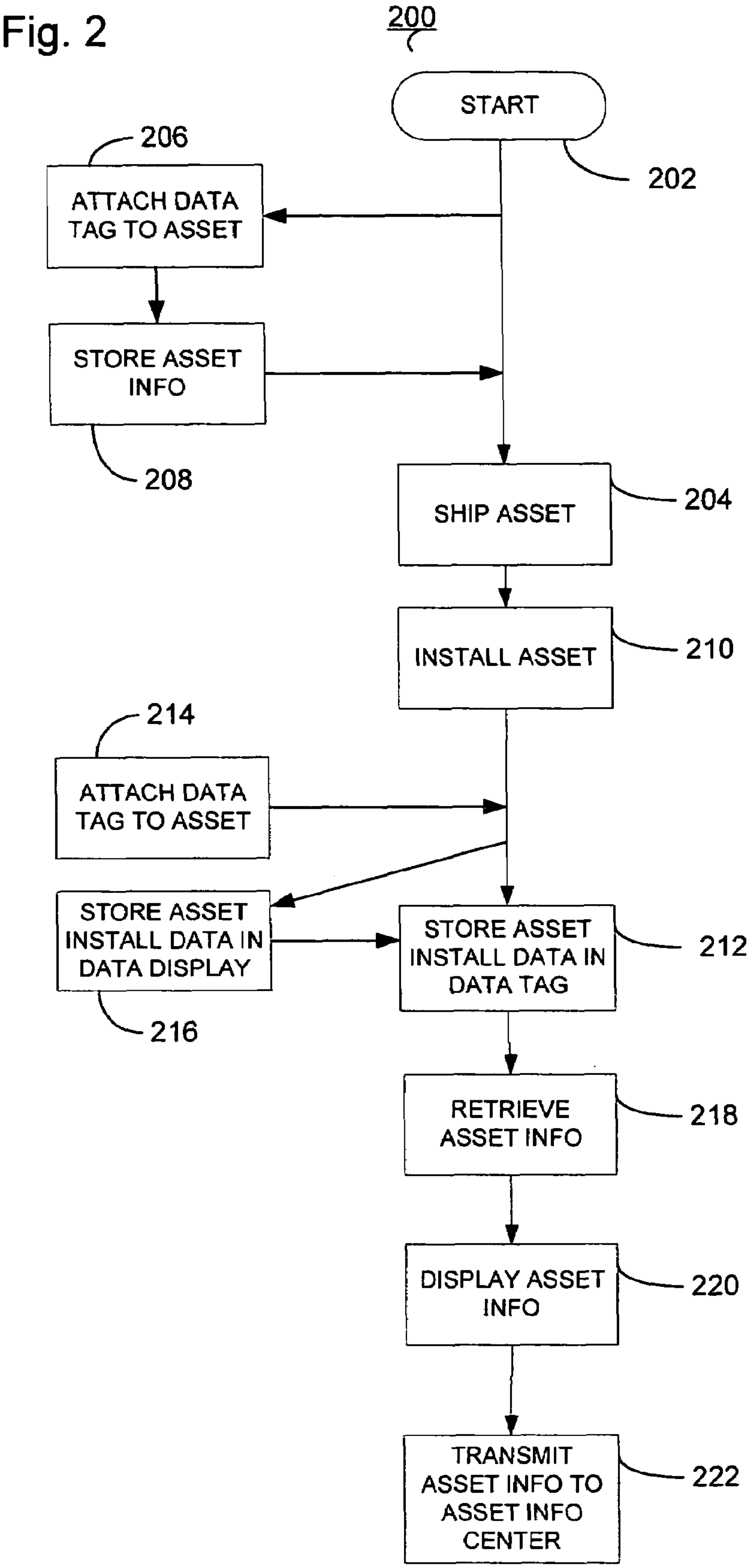
FIG. 2 is a flow chart for a method of asset management according one implementation of the invention.

FIG. 2 illustrates one implementation of an asset management method according to one operation of the invention. The illustrated implementation begins at operation 202 with the manufacture of asset 104. Asset 104 is shipped in operation 204 and installed in a customer location in operation 210. In an optional implementation, a data tag 102 is attached to asset 104 by the manufacturer or a representative or distributor. Asset information relative to asset 104 is stored in asset data tag 102 in operation 208, which may be before or after attachment of data tag 102 to asset 104 in operation 206. Operation 208 is performed by an operator using access device 106.

After asset 104 is placed or installed at the customer location in operation 210, asset data or information may be stored in data tag 102 as in operation 212 using access device 106. In operation 212, the asset information stored may be that related to the installation of asset 104 that may include, among other data items, the installed date, the installer or installing entity, and the location that asset 104 was installed. Additionally, where asset data tag 102 was not installed or stored with manufacturer data previously, as in optional operations 206 and 208, operations 214 and 216 provide for attachment of asset tag 102 to asset 104 and for storing manufacture data. Operations 216 and 212 may also utilize access device 106 for transmitting asset information to asset tag 102 for storing.

While shown as a two operation data tag initialization, in other implementations one or more initializations of data tag 102 or the storing of asset data related to a single asset item are consistent with the invention. For instance, in one embodiment, each entity associated with the manufacture, delivery, installation, and service of asset 104 may add an initialization and asset data storage operation during the installation, operation, and service of asset 104. Asset information may also be updated during the service life of asset 104 and data tag 102 to include service performed or upgrades or changes made to asset 104. Additionally, while not illustrated in FIG. 2, asset information may also be stored in a memory associated with asset data display 108.

Once asset tag 102 and/or asset data display 108 has received asset information, such asset information may be retrieved at a later date. The retrieval of asset data in operation 218 may include scanning or receiving asset information with access device 106 from one or more asset tags 102 associated with one or more assets 104. Such data may be viewed with an optional display of access device 106 or may be transmitted from access device 106 to an asset display device 108. Additionally, asset information may be transmitted in operation 222 to an asset information center or system 120. Optionally, asset information may also be transmitted from asset tag 102 or from access device 114 directly to asset information system 120.

In one embodiment, asset management method includes initializing data tag 102 with asset information. Such initializing may include transmitting the asset information to data tag 102 and storing the asset information in asset tag memory 126. The method also includes retrieving the asset information from data tag 126. In an optional operation, the retrieved asset information is displayed either locally, on access device 106, on asset data display 108, or at asset information system or center 120.

The transmission of asset information from asset tag 102 to access device 106 or asset information center 120 may be a function of receiving a request or a query, or may be based on a predetermined or preprogrammed request that may be periodic, scheduled, or continuous. Additionally, in some embodiments, the transmission may be a result of one or more operational events or activities associated with the operation of asset 104. For instance, the transmission of asset data may be a result of a failure or a lapse of operating time of asset 104.

In other implementations, a method according to one implementation may include initialization of data tag 102 that includes assigning a unique asset data tag identification to asset tag 102. This includes transmitting asset information to the data tag and storing the transmitted asset information in the data tag memory.

Figure 3:
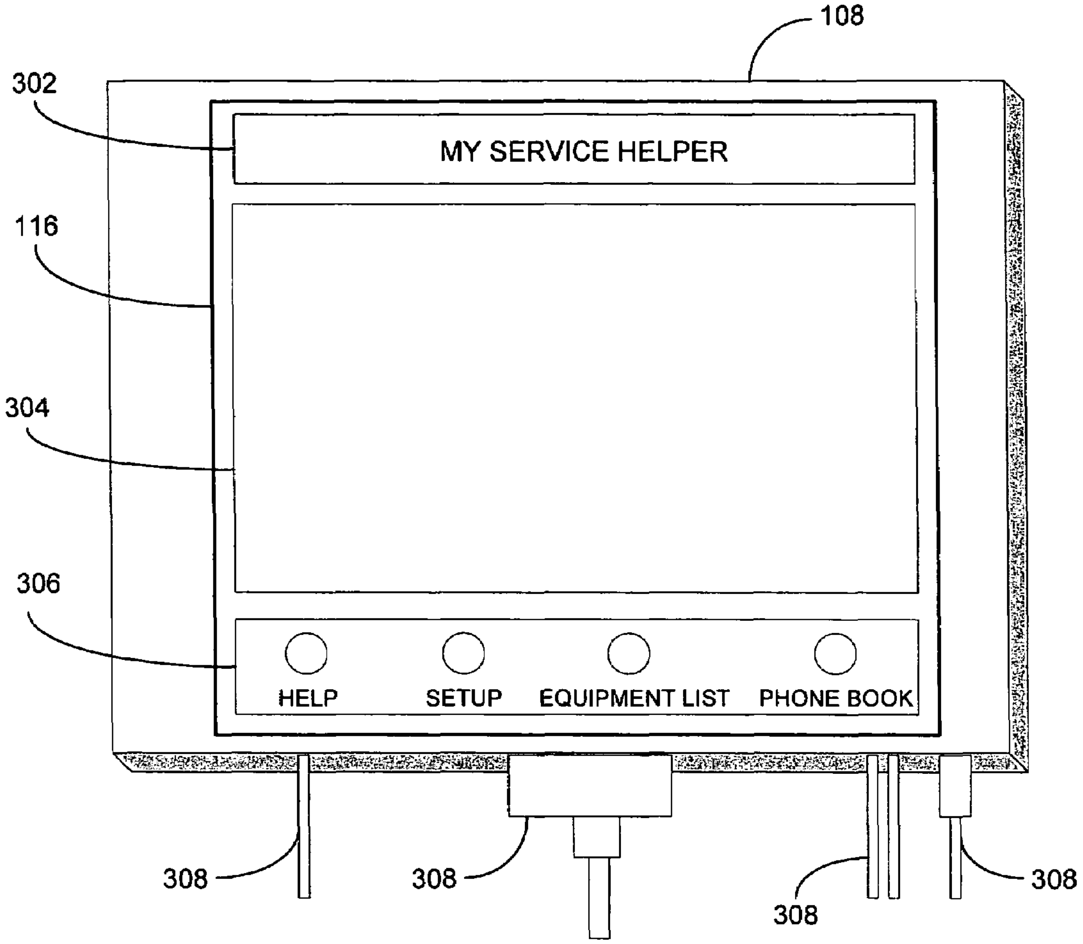
FIG. 3 is an illustration of an asset display device for displaying asset information according to one embodiment of the invention.

One embodiment of asset data display 108 is provided in FIG. 3. As shown, asset data display 108 configured with one or more display screens 116 and one or more communication links 308. In this illustrated embodiment, display screen 116 includes three presentation portions or sections, each of which may be configured for one or more screen presentation screens or modes. A screen identification portion 302 may provide the identification of a particular asset data display screen mode that may be displayed from among a plurality of asset data display screen presentations available. In this case, an introduction identification display indicates "My Service Helper." A second portion of screen 116 is the information display portion 304. Information display portion 304 provides for the presentation of detailed asset data information. A third portion of screen 116 provides a user input presentation portion 306. In user input presentation portion 306, one or more user input options are provided, possibly by a local touch screen function or by another user input function such as a mouse, voice command, keyboard entry, or otherwise. In one embodiment, the user input presentation portion varies as a function of the particular screen being presented in display screen 116 and as indicated in screen identification portion 302. In this example, user input portion 306 includes three items, a help input, a setup input, an equipment list mode selection input, and a phone book input.

In should be understood to one skilled in the art that in another embodiment of asset data display 108, user input presentation may be implemented in a hard key or soft key arrangement that may be separate from display screen 116 but included in or associated with asset data display 116. It should also be understood that asset data display 108 and display screen 116 may be configured with more than or less than three display portions as the illustrated embodiment depicts three portions only for illustration purposes.

Figure 4:
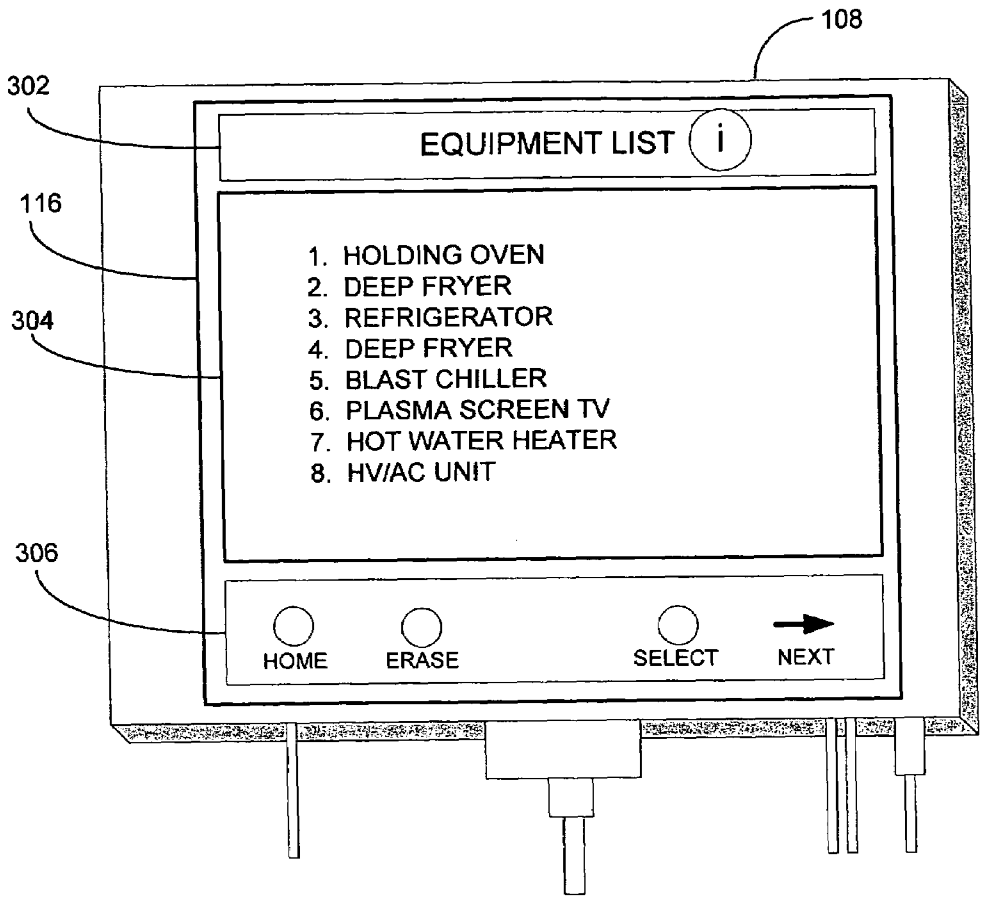
FIG. 4 is an asset display device displaying a list of managed assets according to one embodiment of the invention.

As illustrated in FIG. 4, asset data display 108 may display an equipment list in a equipment list mode. As illustrated, in equipment list mode, identification portion 302 may display a heading such as equipment list. Information display 304 may provide a complete or partial list of all managed assets associated with asset display 108. User input portion 306 may include one or more user input selections associated with management or selection of one or more of the assets listed in the asset list. For example, a user may select to delete a particular asset if asset 104 is no longer at that location or has been replaced. The user may also select a particular asset on the list to obtain further or detailed asset data. Additionally, if there are more assets than may be listed on a single information screen 304, the user may select another page or a previous page to scroll through the listing of assets.

Figure 5:
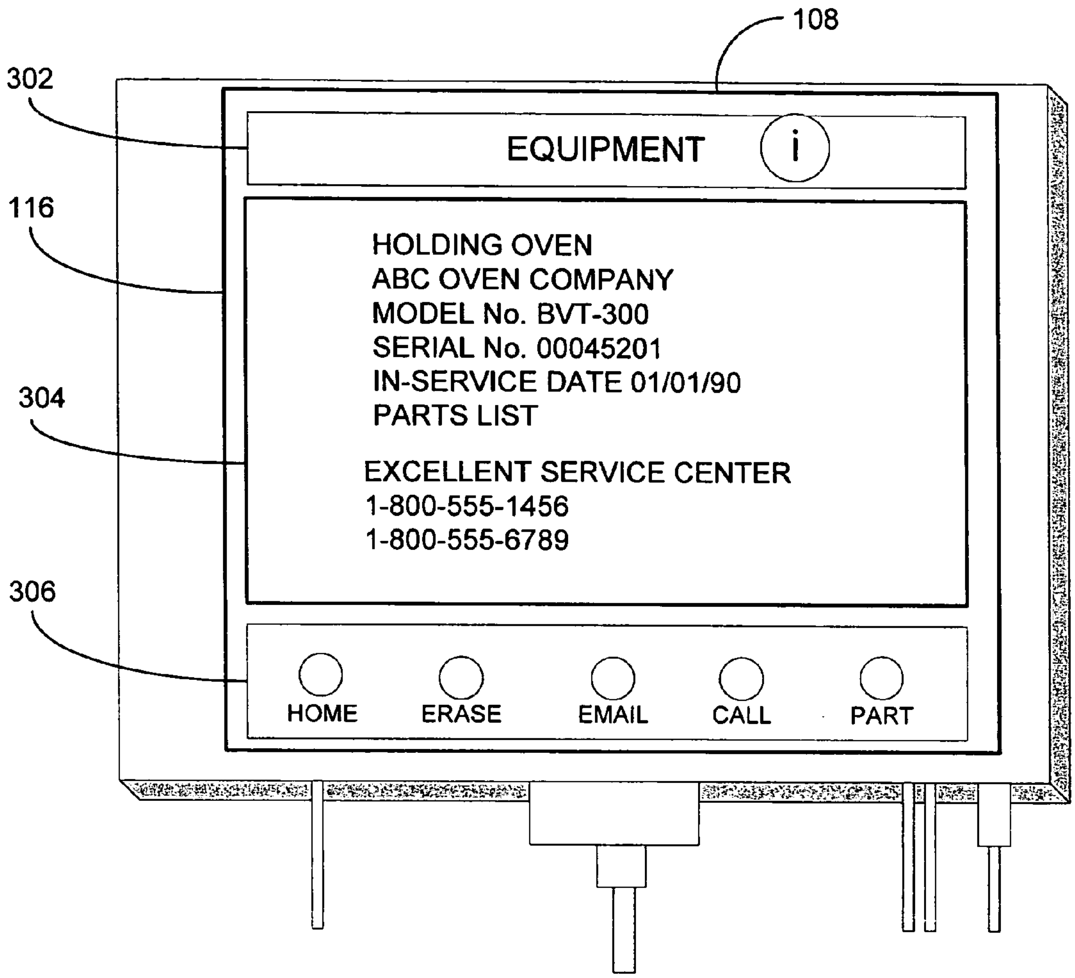
FIG. 5 is a screen display of asset part information as displayed by an asset display device according to one embodiment of the invention.

As an example of a screen mode showing a particular asset selected by the user, FIG. 5 illustrates the selection of the Holding Oven from the list of FIG. 4. In this case, an equipment identification screen presentation is provided that provides a complete list or partial list of asset information for the selected asset. As illustrated in information portion 304, the manufacturer of the holding oven, model number, the serial number, and an in-service date may be presented on the display. In some cases, if components parts are included in asset 104, a parts or components list may also be presented as an option. One or more screen presentations may be displayed for each particular selected asset. Additionally, one or more service contacts for asset 104 may be displayed and may include a contact phone number, an email address, or a physical address. The user input screen presentation 306 may include an option for erasing all or a portion of the information, for automatically generating an email or a telephone call to one of the service providers. Additionally, the user may select to have a listing of parts or part numbers for asset 104 displayed.

Figure 6:
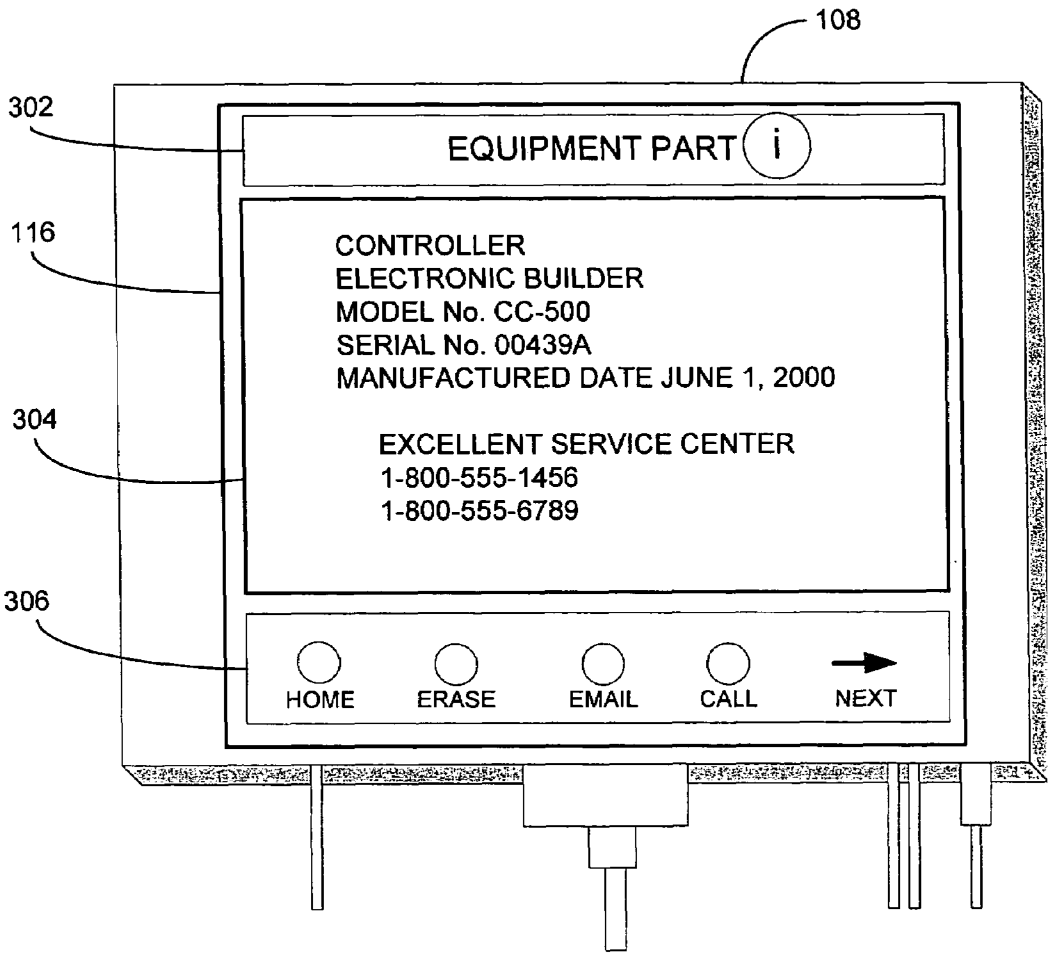
FIG. 6 is a second screen display of another asset part information as displayed by an asset display device according to another embodiment of the invention.

An example of asset data display 108 displaying information associated with a particular part is illustrated in FIG. 6. In this example, the user may have selected a particular part, illustrated as the controller, from the holding oven displayed in the example of FIG. 5. In this case, asset information relative to the controller part of the holding oven is displayed in the information display portion 306 of asset data display 108. When available, one or more service contacts may also be presented with regard to the particular part of asset 104.

The display screens and data presentations illustrated in FIGS. 3–6 are only illustrative in nature and are not intended to be limiting.

In one preferred embodiment, asset 104 is an industrial or commercial kitchen component or equipment such as a griddle, a fryer, a refrigerator, an oven, a blast chiller, a cooking unit, and a refrigeration unit. In such an embodiment, asset 104 may be located in a restaurant, hotel, school, fraternity house, motel, convention hall, association hall, office building, etc. Data tag memory 126 is configured to store data compliant with data specifications as defined by the North American Association of Food Equipment Manufactures (NAFEM). However, in this embodiment, the stored and communicated data includes the identification of two or more service contacts or service organizations. The NAFEM specification provides a Contact field of 255 characters for contact information. However, in this preferred embodiment, the format provides for multiple contacts with multiple sets of contact information. In this case, the contact name is provided along with an information type which is represented by an integer. Types of information may be represented in one embodiment with integers from 0 to 99. For example, integers may be assigned such as: 1 for contact name, 2 for email address, 3 for phone number, 4 for pager number, etc.

In this embodiment, access device 106 retrieves asset information from data tag memory 126 that includes the two or more service contacts along with their contact information. This asset information is communicated to the asset data display 108 that in turn stores this retrieved information. Asset data display 108 and, in some cases, access device 106 may be configured to display the multiple service contacts and their contact information. Additionally, in a preferred embodiment asset data display 108 is configured to utilize particular contact information of the asset information to initiate a service request or contact to a particular or selected service provider. For instance, asset data display 108 may initiate a preprogrammed email to be sent to one of the service providers, initiate a telephone call or fax by coordinating with the associated telecommunication device 124. In this manner, the contact information stored in data tag 102 is utilized to provide for automatic contacting of one of the service providers according to the enhanced NAFEM-compliant contact information.

Figure 7:
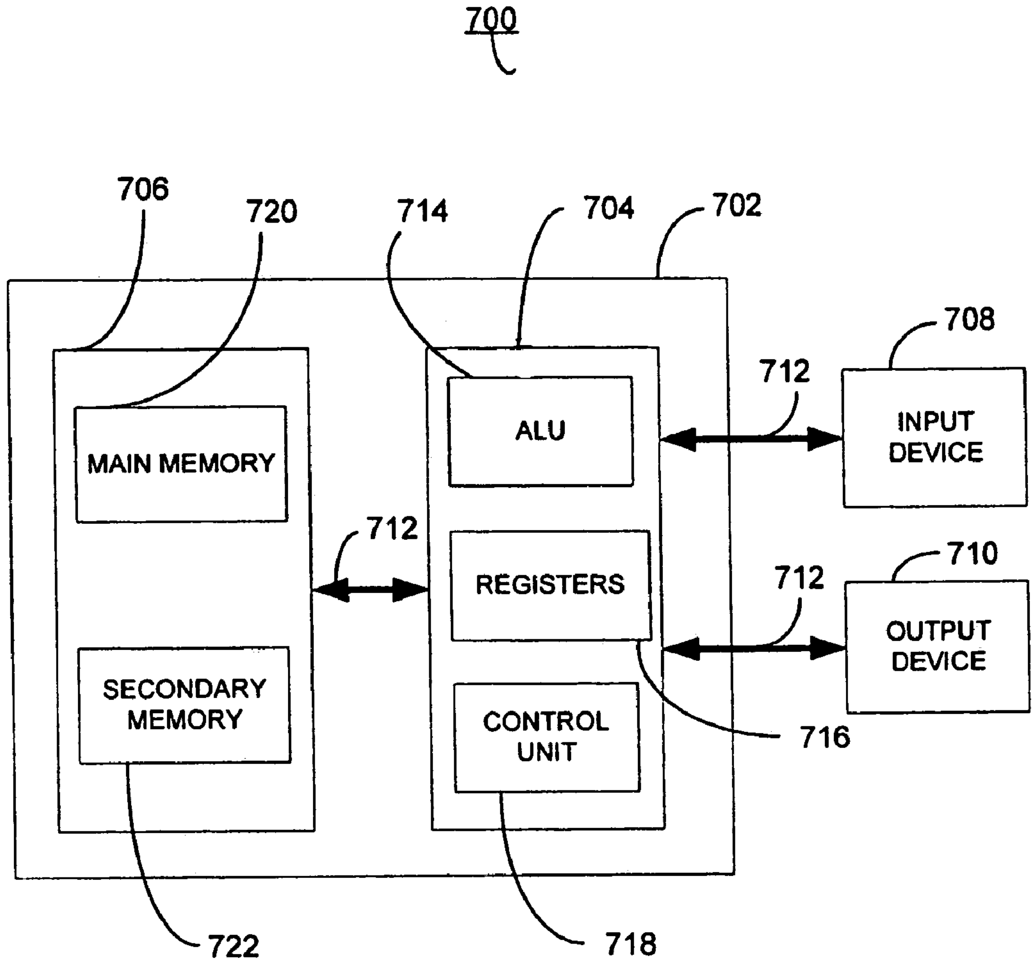
FIG. 7 is a block diagram of a computer system that may be used to implement one or more methods or apparatus embodying the invention.

Referring to FIG. 7, one or more components or functions of the invention such as data tag 126, access device 106, and asset data display 108 may be implemented in an operating environment that may include a computer system 700 with a computer 702 that comprises at least one processing unit (CPU) 704, a memory system 706, an input device 708, and an output device 710. These elements are interconnected by at least one bus structure 712.

CPU 704 may be of familiar design that includes an arithmetic logical unit (ALU) 714 for performing computations, a collection of registers 716 for temporary storage of data and instructions, and a control unit 718 for controlling operation of system 700. Any of a variety of processors, including at least those from Digital Equipment, Sun, MIPS, Motorola, NEC, Intel, Cyrix, AMD, HP, and Nexgen, are equally preferred for CPU 704. The illustrated embodiment of the invention may operate on an operating system designed to be portable to any of these processing platforms.

Memory system 706 may generally include a main memory 720 in the form of a medium such as random access memory (RAM) and read only memory (ROM) semiconductor devices, and a secondary storage 722 in the form of long term storage mediums such as floppy disks, hard disks, tape, CD-ROM, flash memory, etc. and other devices that store data using electrical, magnetic, optical or other recording media. Main memory 720 also can include video display memory for displaying images through a display device. Those skilled in the art will recognize that memory system 706 can comprise a variety of alternative components having a variety of storage capacities.

Input device 708 and output devices 710 may also be familiar. Input device 708 can comprise a keyboard, a mouse, an optical wand or reader, a physical transducer (e.g. a microphone), etc. Output device 710 can comprise a display, a printer, a transducer (e.g. a speaker), etc. Some devices, such as a network adapter or a modem, can be used as input and/or output devices.

As is familiar to those skilled in the art, computer system 700 further may include an operating system and at least one application program. The operating system is the set of software which controls the computer system's operation and the allocation of resources. The application program is the set of software that performs a task desired by the user, using computer resources made available through the operating system. Both may be resident in memory system 706.

In accordance with the practices of persons skilled in the art of computer programming, the present invention is described below with reference to symbolic representations of operations that are performed by the computer system 700. Such operations are sometimes referred to as being computer-executed. It will be appreciated that the operations which are symbolically represented include the manipulation by CPU 704 of electrical signals representing data bits and the maintenance of data bits at memory locations in memory system 706, as well as other processing of signals. The memory locations where data bits are maintained are physical locations that have particular electrical, magnetic, or optical properties corresponding to the data bits. One or more components of the invention such as data tag 126, access device 106, and asset data display 108 may be implemented, at least in part, in a program or programs, comprising a series of instructions stored on a computer-readable medium. The computer-readable medium can be any of the devices, or a combination of the devices, described above in connection with memory system 706.

These various embodiments provide for increasing the opportunities for electronic tagging assets and appliances, and reducing the cost of electronic asset management.

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. An asset management and service system for locally managing asset information, the system comprising:

a data tag for storing asset information including at least one of service information, warranty information, and service provider contact information and configured for attaching to an asset, said data tag including a data tag memory for storing information related to the asset on which the data tag is attached and a data tag communication interface for receiving and transmitting the asset information;

an access device for communicating with said data tag communication interface, said access device including an access device communication interface and an access device memory, wherein the access device is configured for activating the data tag communication interface when positioned in proximity to the data tag and retrieving asset information stored in the data tag memory over the access device communication interface; and an asset data display for displaying the asset information retrieved from the access tag by the access device.

2. The system of claim 1 wherein the data tag is configured for attachment to a surface of the asset.

3. The system of claim 1 wherein the asset is selected from the group consisting of an appliance, a household appliance, a kitchen appliance, a HV/AC unit, a hot water heater, an audio unit, and a video unit.

4. The system of claim 1 wherein the asset is selected from the group consisting of a griddle, a fryer, a refrigerator, an oven, a blast chiller, a cooking unit, and a refrigeration unit.

5. The system of claim 1 wherein the asset information stored in the data tag includes a name of asset manufacturer, model number, serial number, and manufactured date and at least one or more asset information selected from the group consisting of equipment classification, installed date, asset data tag software version, asset protocol version, warranty terms, warranty length, warranty termination date, service action data, asset owner name, and asset location.

6. The system of claim 1 wherein the access device includes a data entry for receiving asset information from an external source, said access device communicating said received asset information to the data tag, wherein said data tag stores the received asset information upon receipt.

7. The system of claim 1 wherein the data tag communication interface is at least one of a touch communication interface, a wireless communication interface, a wireless optical interface, and a satellite communication interface.

8. The system of claim 1 wherein the access device is a standalone portable device and the access device communication interface is further configured for communicating with an asset data information system, said access device communicating the retrieved asset information to the external asset data information system.

9. The system of claim 8, wherein the asset data information system including an information system communication interface for communicating asset information with at least one of the asset tags, the access device, and the asset data display.

10. The system of claim 1 wherein the access device retrieves and stores a plurality of asset information from a plurality of data tags related with one or more assets at a particular location and where the asset data display displays asset information of the one or more assets.

11. The system of claim 1 wherein the asset data display including a data display communication interface for communicating with the access device and receiving the asset information stored in the access device memory and wherein the asset data display includes an asset data display memory for storing the received asset information, said asset data display displaying the stored received asset information.

12. The system of claim 1 wherein the asset data display and access device are configured as a single unit.

13. The system of claim 1 wherein the data tag, access device, and asset data display are configured for communicating and storing asset information compliant with an asset management data format defined by the North American Association of Food Equipment Manufactures (NAFEM).

14. The system of claim 1 wherein the access device is selected from the group consisting of a pocket personal computer, a PDA, custom tag reader, a mobile phone, and a personal computer.

15. The system of claim 1 wherein the access device communication interface communicates with the data tag over a wireless communication facility.

16. The system of claim 1 wherein the asset information includes contact information for two or more service providers and wherein the asset data display includes a user selection device for selecting one of the two or more service providers from the displayed asset information.

17. The system of claim 16 wherein the asset data display generates a communication to the selected one of the two or more service providers, said communication being selected from the group consisting of a telephone call, an electronic mail message, and a facsimile.

18. The system of claim 1 wherein the data tag is operable independent of other operations of the asset and wherein the data tag communication interface is independent of a communication network.

19. An asset management and service method for locally managing information related to assets, the method comprising:

initializing a data tag with information corresponding to an associated asset, said initializing includes transmitting asset information to the data tag and storing the asset information in a memory of said data tag, said asset information including at least one of service provider contact information and service information;

retrieving the asset information from the data tag; and displaying the retrieved asset information.

20. The method of claim 19, further comprising generating a communication to a service provider as a function of the included service provider contact information, said communication being selected from the group consisting of a telephone call, an electronic mail message, and a facsimile.

21. The method of claim 19, further comprising attaching the data tag to the asset associated with the data tag following at least one of a manufacturing, a shipping, an installation, and a servicing of the asset.

22. The method of claim 19 wherein the asset is selected from the group consisting of an appliance, a household appliance, a kitchen appliance, a HV/AC device, a hot water heater, an audio device, a video device, an industrial device, and a manufacturing device.

23. The method of claim 19 wherein the asset is selected from the group consisting of a griddle, a fryer, a refrigerator, an oven, a blast chiller, a cooking unit, and a refrigeration unit.

24. The method of claim 19 wherein the asset information stored in the data tag is selected from the group consisting of equipment classification, installed date, asset data tag software, warranty terms, warranty length, warranty termination date, service action data, asset owner name, and asset location.

25. The method of claim 19 wherein the asset information is compliant with an asset management data format of the North American Association of Food Equipment Manufactures (NAFEM).

26. The method of claim 19 wherein the service provider contact information includes contact information for two or more service providers.

27. The method of claim 19 wherein the access device is selected from the group consisting of an asset data display device, a pocket personal computer, a PDA, custom tag reader, a mobile phone, a personal computer, and an asset data information system.

28. The method of claim 19 wherein the retrieving is a function of at least one of a request, a periodic basis, a scheduled basis, and a continuous basis.

29. The method of claim 19 wherein the initialization of the data tag includes one or more initializations related to a single asset item, wherein each of the one or more initializations are provided by an entity related to the manufacture, delivery, installation, and service of the asset item.

30. The system of claim 19 wherein initializing the data tag is independent of other operations of the asset and wherein transmitting asset information for initializing the data tag is independent of a communication network.

31. An asset management and service system comprising:

means for storing asset information in a data tag, said asset information including a characteristic of an asset and contact information for two or more service providers;

means for attaching the data tag to the asset;

means for retrieving the stored asset information from the data tag;

means for displaying the retrieved asset information; and means for generating a communication to at least one of the two or more service providers as a function of the retrieved asset information.

32. The system of claim 31 wherein the asset information includes service information associated with a service performed on the asset.

33. An asset management method for kitchen appliances comprising:

attaching a data tag to an asset, said data tag including a memory; and initializing the data tag with asset information, said initializing includes transmitting asset information to the data tag wherein the transmitted asset information is stored in the data tag memory, said asset information including service contact information for two or more service providers.

34. The method of claim 33 wherein the asset is selected from the group consisting of a griddle, a fryer, a refrigerator, an oven, a blast chiller, a cooking unit, and a refrigeration unit.

35. The method of claim 33 wherein the asset information stored in the data tag memory is selected from the group consisting of an equipment classification, installed date, asset data tag software version, asset protocol version, warranty terms, warranty length, warranty termination date, service action data, service information, asset owner name, and asset location.

36. The method of claim 33 wherein the asset information is compliant with an asset management data format of the North American Association of Food Equipment Manufactures (NAFEM).

37. The method of claim 33, further comprising displaying the asset information including the contact information for the two or more service providers and generating a communication to one of the two or more service providers as a function of the contact information, said communication being selected from the group consisting of a telephone call, an electronic mail message, and a facsimile.

38. The system of claim 33 wherein initializing the data tag is independent of other operations of the asset and wherein transmitting asset information for initializing the data tag is independent of a communications network.

39. The system of claim 33 wherein the asset information includes service information associated with a service performed on the asset.

40. An asset management and service system comprising:

an asset;

a data tag attached to a surface of the asset, said data tag including a data tag memory for storing data and a data tag communication interface configured for wirelessly receiving an activation signal from a remote device when placed in proximity to the data tag and activating the wireless transmission of data stored in the data tag memory in response to receiving the activation signal; and asset information stored in the data tag memory, said asset information including a characteristic of the asset and service contact information for two or more service providers.

41. The system of claim 40, further comprising an access device including an access device communication interface and an access device memory, said access device communication interface communicating with said data tag communication interface and retrieving the asset information stored in the data tag memory.

42. The system of claim 40, further comprising an asset data display for displaying the asset information retrieved from the data tag by the access device.

43. The system of claim 42 wherein the asset data display generates a communication to one of the two or more service providers as a function of the received service contact information, said communication being selected from the group consisting of a telephone call, an electronic mail message, and a facsimile.

44. The system of claim 41 wherein the asset information includes at least one warranty information associated with the asset on which the data tag is attached and service information associated with a service performed on the asset.

45. The system of claim 40 wherein the data tag is operable independent of other operations of the asset and wherein the data tag communication interface is independent of a communication network.

* * * * *